July 5, 1932.   J. WEBBER ET AL   1,866,243
MILLIAMPERE AND VOLTAGE METER
Filed May 10, 1930    2 Sheets-Sheet 1

J. Webber & J. Cooper
INVENTORS

July 5, 1932.  J. WEBBER ET AL  1,866,243
MILLIAMPERE AND VOLTAGE METER
Filed May 10, 1930  2 Sheets-Sheet 2

J. Webber & J. Cooper
INVENTORS

Patented July 5, 1932

1,866,243

UNITED STATES PATENT OFFICE

JOSEPH WEBBER, OF MANCHESTER, AND JOSEPH COOPER, OF MARKET DRAYTON, ENGLAND, ASSIGNORS TO PROVINCIAL INCANDESCENT FITTINGS COMPANY LIMITED, OF MANCHESTER, ENGLAND, A BRITISH COMPANY

MILLIAMPERE AND VOLTAGE METER

Application filed May 10, 1930, Serial No. 451,357, and in Great Britain September 4, 1929.

This invention relates to instruments for use in the testing of wireless or other electrical apparatus and has for its object to provide a new or improved instrument adapted for the testing of the filament of a thermionic valve and also if desired for the testing of the high and low tension batteries or other sources of high and low tension current.

The invention comprises a meter or measuring instrument incorporating a battery, a voltmeter and a valve holder arranged so that when a valve is placed in the holder, a reading is given by the voltmeter if the valve filament is in order.

The invention further comprises the incorporation of the valve holder and battery in an instrument arranged for the testing of high and low tension batteries, the said instrument having one indicating finger moving over a multiple scale.

Referring to the accompanying explanatory drawings:—

The same reference letters in the different views indicate the same or similar parts.

In Figures 1–4, the instrument which is of the watch type comprises a casing $a$ into which projects a metal tube $b$ adapted to contain an electric battery $c$. The cap $d$ of the tube $b$ fits into the case $a$ and makes contact with the terminal $e$ of the battery. A blade spring $f$ makes contact with the other pole of the battery and has a lead $g$ connected thereto and to one end of the voltmeter coil $h$, the finger $i$ of the voltmeter having the moving iron secured thereto in the known manner. The other end of the coil $h$ is connected by the lead $j$ to the blade $k$. $m$ is the permanent magnet of the voltmeter.

The rear cover $n$ of the instrument has holes $o$, $p$ therein to receive the terminals of the thermionic valves to be tested. The two holes $o$ which receive the filament terminals are metal bushed and connected to two spring blades $q$, $r$, the blade $q$ making contact with the tube $b$ and so through the cap $d$ making connection with the battery terminal $e$, whilst the blade $r$ makes contact with the blade $k$.

Thus when a valve has its terminals placed in the holes $o$, $p$, the filament thereof is in circuit with the battery $c$ and the voltmeter coil $h$. Therefore, if the filament is intact, a reading will be given by the pointer $i$ upon the scale $s$ on the face of the instrument.

If desired, a cap similar to $d$ may be provided in the case at the side opposite to the other end of the tube $b$ so that when the additional cap is removed, a tool or instrument may be inserted to press the battery out of the tube $b$ when it has to be renewed.

Figure 1:
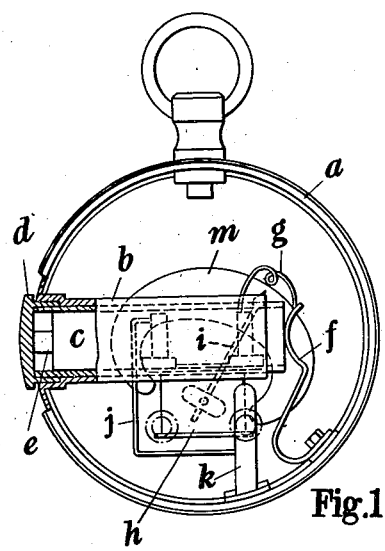
Figure 1 is a rear view of a valve filament testing instrument with the back cover removed and with certain parts in section, constructed in one convenient form.
Figure 2:
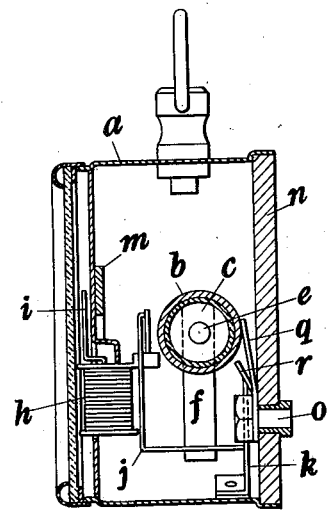
Figure 2 is a sectional side elevation, Figure 3 a rear view with certain internal parts shown in dotted lines and Figure 4 a front view of the instrument shown in Figure 1.
Figure 3:
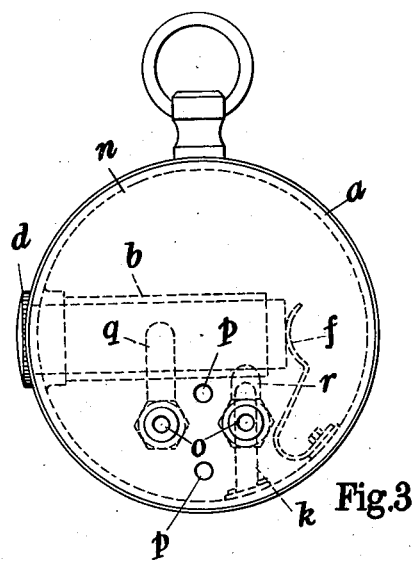
Figure 4:
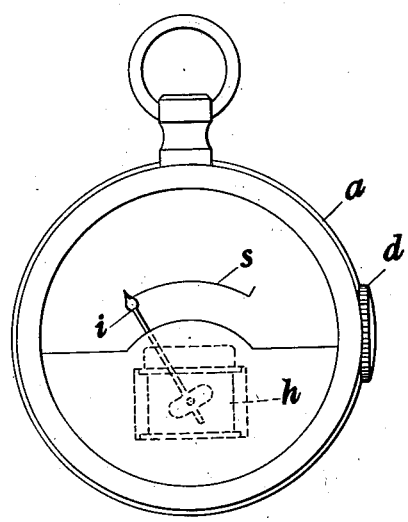
Figure 5:
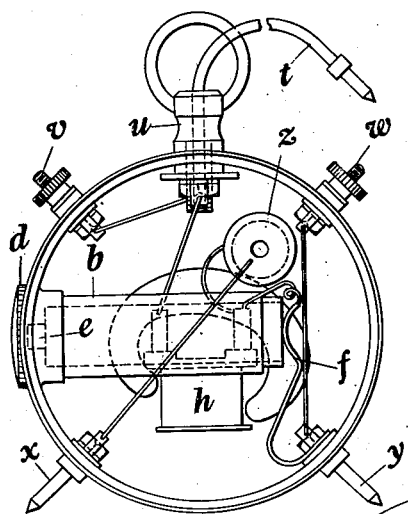
Figure 5 is a rear view with the cover removed and Figure 6 a rear view with the cover in place but with certain internal parts shown in dotted lines, of an instrument adapted for the testing of high and low tension batteries in addition to the filaments of thermionic valves.
Figure 6:
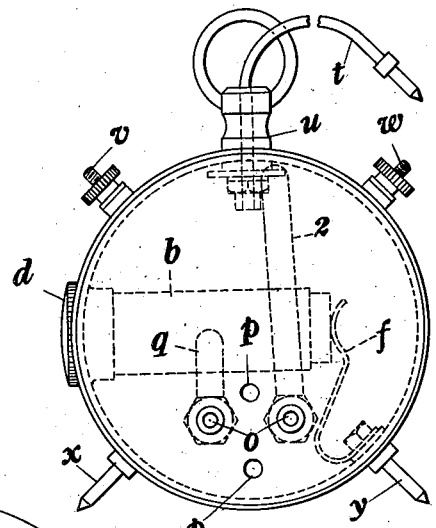

The instrument shown in Figures 5 and 6 is adapted for testing the voltage of high and low tension batteries and the current in milliamperes of the high tension battery. For this purpose a flexible lead $t$ is taken from the ring pillar $u$ which is insulated from the casing $a$. Upon the casing are also arranged the insulated terminals, $v$, $w$, $x$ and $y$. If the two terminals $v$ and $w$ are connected in circuit with a high tension battery, the flow of current in milliamperes will be indicated by the instrument. The internal circuit then consists of the terminal $v$, the pillar $u$, the coil $h$, the blade $f$, the terminal $y$ and the terminal $w$. If the lead $t$ and the terminal $y$ be in service, then a voltage test of a low tension battery can be made, the internal circuit comprising the blade $f$, the coil $h$ and the pillar $u$. For testing a high tension battery for voltage, the lead $t$ and the terminal $x$ are used, the internal circuit then consisting of the resistance coil $z$, the coil $h$ and the pillar $u$. To test the filament of a thermionic valve, the latter is plugged into the back plate of the instrument when the internal circuit completed by the filament of the valve comprises the blade $q$, tube $b$ and one pole of the battery in the tube, the other pole of the battery the spring blade $f$, the coil $h$, the pillar $u$ and the blade 2 which engages a part upon said pillar when the cover is in place and which is secured upon one of the terminal bushes $o$ on the inner side of the rear plate.

In place of the terminal posts $v, w, x$ and $y$, we may employ flexible leads for testing purposes.

Figure 7:
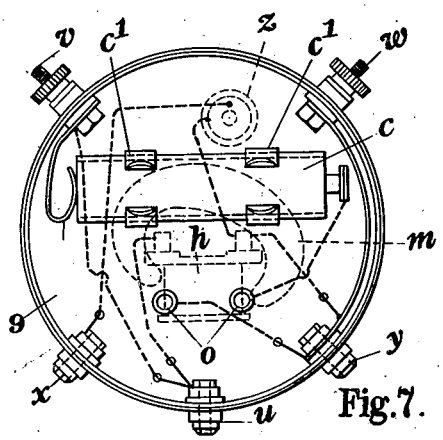
Figure 7 is a rear view with the cover removed and Figure 8 a sectional side elevation of a modified construction of the instrument shown in Figures 5 and 6.
Figure 8:
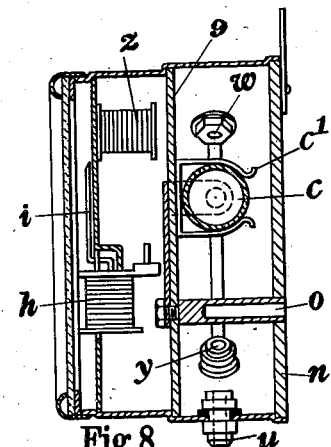

In the instrument shown in Figures 7 and 8, the battery $c$ is carried in clips $o^1$ upon a plate or division 9 within the casing, such plate also having the sockets $o$ for the thermionic valve plugs projecting therefrom. The rear cover $n$ fits over the ends of such sockets as shown.

Figure 9:
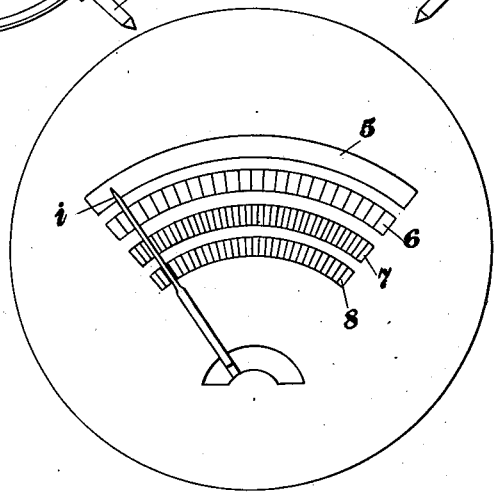
Figure 9 shows the dial or face of the instruments shown in Figures 5, 6, 7 and 8.

In Figure 9, 5 indicates the scale associated with the testing of the filament of the thermionic valve, 6 the scale associated with the testing of the voltage of a low tension battery, 7 the scale associated with the testing of the voltage of a high tension battery and 8 the scale for testing the current in milliamperes of the high tension battery.

We claim:—

1. An electric testing instrument of the watch case type incorporating within its casing, a battery, a voltmeter movement, and a valve holder arranged so that when a thermionic valve is placed in the holder, a reading is given by the voltmeter if the valve filament is in order.

2. An electric testing instrument of the watch case type as claimed in claim 1, in which the battery is in a tube extending across the instrument and the valve holder is constituted by the rear cover of the instrument, with blade springs upon such cover for completing the testing circuit.

3. In an electric testing instrument of the watch case type as claimed in claim 1 and in which the voltmeter serves also for testing high and low tension batteries for voltage and high tension circuits for currents, the mounting of the battery in clips upon a plate or division wall within the instrument, the sockets for the thermionic valve filament plugs projecting through the rear cover of the instrument.

In testimony whereof we have signed our names to this specification.

JOSEPH WEBBER.
JOSEPH COOPER.